(12) United States Patent
Sebastian et al.

(10) Patent No.: US 8,516,253 B1
(45) Date of Patent: Aug. 20, 2013

(54) SELF-KEYED PROTECTION OF ANTICIPATORY CONTENT

(75) Inventors: William B. Sebastian, Quincy, MA (US); Dan Newman, Littleton, MA (US)

(73) Assignee: ViaSat, Inc., Carlsbad, CA (US)

( * ) Notice: Subject to any disclaimer, the term of this patent is extended or adjusted under 35 U.S.C. 154(b) by 198 days.

(21) Appl. No.: 13/008,765

(22) Filed: Jan. 18, 2011

Related U.S. Application Data

(60) Provisional application No. 61/295,880, filed on Jan. 18, 2010.

(51) Int. Cl.
   *H04L 9/32* (2006.01)

(52) U.S. Cl.
   USPC .......................................................... 713/168

(58) Field of Classification Search
   None
   See application file for complete search history.

(56) References Cited

U.S. PATENT DOCUMENTS

| | | | |
|---|---|---|---|
| 5,408,470 A | 4/1995 | Rothrock | |
| 5,740,367 A | 4/1998 | Spilo | |
| 5,870,754 A | 2/1999 | Dimitrova | |
| 5,905,981 A | 5/1999 | Lawler | |
| 6,182,133 B1 | 1/2001 | Horvitz | |
| 6,339,787 B1 | 1/2002 | Yohe | |
| 6,701,316 B1 * | 3/2004 | Li et al. | 370/395.41 |
| 6,879,808 B1 | 4/2005 | Nations | |
| 7,124,305 B2 | 10/2006 | Margolus | |
| 7,130,890 B1 | 10/2006 | Kumar | |
| 7,340,510 B1 | 3/2008 | Liskov et al. | |
| 7,359,956 B2 | 4/2008 | Kanai | |
| 7,430,331 B2 | 9/2008 | Singh | |
| 7,509,667 B1 | 3/2009 | Cook | |
| 7,636,767 B2 | 12/2009 | Lev-Ran | |
| 7,680,897 B1 | 3/2010 | Carter | |
| 7,681,032 B2 | 3/2010 | Peled | |

(Continued)

FOREIGN PATENT DOCUMENTS

| | | |
|---|---|---|
| WO | WO 01/61886 A2 | 8/2001 |
| WO | WO 01/84777 A2 | 11/2001 |
| WO | WO 02/41527 A1 | 5/2002 |
| WO | WO 2007/051079 A2 | 5/2007 |

OTHER PUBLICATIONS

U.S. Appl. No. 12/651,909, filed Jan. 4, 2010 (copy not attached).

(Continued)

*Primary Examiner* — Farid Homayounmehr
*Assistant Examiner* — Henry Tsang
(74) *Attorney, Agent, or Firm* — Kilpatrick Townsend & Stockton LLP

(57) ABSTRACT

Systems and methods are provided to facilitate anticipatory pushing of content to clients of a communications network in such a way that the content is unusable by the anticipatory clients until explicitly requested. Embodiments apply one or more self-keying techniques to a content dataset to generate an anticipatory dataset, such that the anticipatory dataset cannot be used to reconstruct the content dataset without a keying dataset that also can only be generated using the content dataset. The anticipatory dataset is pre-pushed to a client in anticipation of a future request for the content. If and when the client subsequently issues a request for the content dataset, the server intercepts the new copy of the content dataset received in response to the request, uses the content dataset to generate the keying dataset, and communicates the keying dataset to the client for local reconstruction of the content dataset by the client.

19 Claims, 8 Drawing Sheets

(56) References Cited

U.S. PATENT DOCUMENTS

| | | |
|---|---|---|
| 7,716,367 B1 | 5/2010 | Leighton |
| 7,778,438 B2 | 8/2010 | Malone |
| 7,814,149 B1 | 10/2010 | Stringham |
| 7,917,531 B2 | 3/2011 | Sakurai |
| 7,941,409 B2 | 5/2011 | Mimatsu |
| 7,953,881 B1 | 5/2011 | Vadlakonda |
| 8,041,677 B2 | 10/2011 | Sumner |
| 8,055,616 B2 | 11/2011 | Johnston |
| 8,082,228 B2 | 12/2011 | Mu |
| 8,151,004 B1 | 4/2012 | Ufimtsev |
| 8,230,059 B1 | 7/2012 | Santos |
| 8,284,773 B1 | 10/2012 | Woleben |
| 2001/0016836 A1* | 8/2001 | Boccon-Gibod et al. ........ 705/51 |
| 2001/0043600 A1 | 11/2001 | Chatterjee |
| 2002/0006116 A1 | 1/2002 | Burkhart |
| 2002/0026478 A1 | 2/2002 | Rodgers |
| 2002/0154887 A1 | 10/2002 | Lu |
| 2002/0188735 A1 | 12/2002 | Needham |
| 2002/0194473 A1* | 12/2002 | Pope et al. .................... 713/168 |
| 2003/0018581 A1* | 1/2003 | Bratton et al. ................. 705/50 |
| 2005/0010870 A1 | 1/2005 | Gu et al. |
| 2005/0033747 A1 | 2/2005 | Wittkotter |
| 2005/0131903 A1 | 6/2005 | Margolus |
| 2006/0184960 A1 | 8/2006 | Horton |
| 2006/0253444 A1 | 11/2006 | O'Toole et al. |
| 2006/0277257 A1 | 12/2006 | Kromann |
| 2006/0288072 A1 | 12/2006 | Knapp |
| 2007/0033408 A1 | 2/2007 | Morten |
| 2007/0101074 A1 | 5/2007 | Patterson |
| 2007/0111713 A1 | 5/2007 | Silverbrook |
| 2007/0116151 A1 | 5/2007 | Thesling |
| 2007/0133554 A1 | 6/2007 | Ederer |
| 2007/0143484 A1* | 6/2007 | Drouet et al. ................. 709/227 |
| 2007/0174246 A1* | 7/2007 | Sigurdsson et al. ............. 707/3 |
| 2007/0220303 A1 | 9/2007 | Kimura |
| 2007/0256021 A1 | 11/2007 | Prager |
| 2007/0288518 A1 | 12/2007 | Crigler |
| 2008/0005086 A1 | 1/2008 | Moore |
| 2008/0066182 A1 | 3/2008 | Hickmott |
| 2008/0144713 A1 | 6/2008 | Kimmich |
| 2008/0155614 A1 | 6/2008 | Cooper |
| 2008/0175239 A1 | 7/2008 | Sistanizadeh |
| 2008/0205396 A1 | 8/2008 | Dakshinamoorthy et al. |
| 2008/0235739 A1 | 9/2008 | Coebergh Van Den Braak |
| 2008/0256138 A1 | 10/2008 | Sim-Tang |
| 2008/0263130 A1 | 10/2008 | Michalowitz |
| 2009/0005547 A1 | 1/2009 | Khvorova |
| 2009/0037393 A1* | 2/2009 | Fredricksen et al. ............. 707/3 |
| 2009/0049469 A1 | 2/2009 | Small |
| 2009/0055862 A1 | 2/2009 | Knoller |
| 2009/0060086 A1 | 3/2009 | Kimmich |
| 2009/0158318 A1 | 6/2009 | Levy |
| 2009/0168795 A1 | 7/2009 | Segel |
| 2009/0234809 A1 | 9/2009 | Bluger |
| 2009/0313329 A1 | 12/2009 | Agrawal |
| 2010/0058430 A1 | 3/2010 | Jones |
| 2010/0083322 A1 | 4/2010 | Rouse |
| 2010/0177642 A1 | 7/2010 | Sebastian et al. |
| 2010/0179984 A1 | 7/2010 | Sebastian |
| 2010/0179986 A1 | 7/2010 | Sebastian et al. |
| 2010/0179987 A1 | 7/2010 | Sebastian et al. |
| 2010/0180046 A1 | 7/2010 | Sebastian et al. |
| 2010/0185730 A1 | 7/2010 | Sebastian |
| 2012/0060121 A1 | 3/2012 | Goldberg |

OTHER PUBLICATIONS

U.S. Appl. No. 12/477,814, filed Jun. 3, 2010 (copy not attached).
U.S. Appl. No. 12/685,729, filed Jan. 12, 2010 (copy not attached).
U.S. Appl. No. 12/684,726, filed Jan. 8, 2010 (copy not attached).
U.S. Appl. No. 12/686,744, filed Jan. 13, 2010 (copy not attached).
U.S. Appl. No. 12/685,920, filed Jan. 12, 2010 (copy not attached).
U.S. Appl. No. 12/684,648, filed Jan. 8, 2010 (copy not attached).
Frantzeskou et al., "Effective Identification of Source Code Authors Using Byte-Level Information," ACM, New York, USA, May 20-28,2006, pp. 893-896, XP040040085 Shanghai, China.
International Search Report for PCT Application No. PCT/US2010/020897, mailed Aug. 16, 2010.
International Search Report for PCT Application No. PCT/US2010/020940, mailed Sep. 22, 2010.
S. Selvakumara, P. Prabhakar "Implementation and comparison of distributed caching schemes," Computer Communications 24 (2001) pp. 677-684.
S. Paula, Z. Feib "Distributed caching with centralized control," Computer Communications 24 (2001) pp. 256-268.
U.S. Appl. No. 61/231,265, filed Aug. 4, 2009, (copy not attached).

* cited by examiner

SELF-KEYED PROTECTION OF ANTICIPATORY CONTENT

CROSS-REFERENCES TO RELATED APPLICATIONS

This application claims the benefit of and is a non-provisional of U.S. Provisional Application Ser. No. 61/295,880, filed on Jan. 18, 2010, titled "SELF-KEYED ENCRYPTION," which is hereby expressly incorporated by reference in its entirety for all purposes.

BACKGROUND

The present invention relates, in general, to communications networks and, more particularly, to managing accessibility by clients to pre-pushed content.

There are many techniques for improving users' experiences with communications services, including for increasing the apparent speed of downloads from the Internet. Some of those techniques involve pushing content to users' terminals in anticipation of a future request for the content by the user (e.g., "prefetching"). For example, a server-side system determines that a user is likely to request a certain web object (e.g., an embedded object on a webpage) in the near future and anticipatorily pushes the object to the user's client-side storage. When the user ultimately requests the object, the request can be processed and fulfilled locally using the pre-pushed version of the object, thereby avoiding delays (e.g., round-trip times, etc.) associated with fulfilling the request over the Internet.

Some content providers desire or even require restricted access to some or all of their content. For example, content providers may require a user to log in to a session prior to gaining access to an object, may limit distribution of the object based on licensing fees or copyright restrictions, etc. Accordingly, while content providers may support improved access to their content, they may not support providing that content to users in an anticipatory fashion (e.g., without sufficiently accounting for licensing, authentication, etc.).

As such, it may be desirable to pre-push content to users in such a way that the content is unusable by the user until the user explicitly requests the content.

SUMMARY

Among other things, methods, systems, devices, and software are provided to facilitate anticipatory pushing of content to clients of a communications network in such a way that the content is unusable by the anticipatory clients until those clients explicitly request the content. Embodiments apply one or more self-keying techniques to a content dataset to generate an anticipatory dataset, such that the anticipatory dataset cannot be used to reconstruct the content dataset without a keying dataset that also can only be generated using the content dataset. The anticipatory dataset is pre-pushed from a server to a client without (e.g., prior to) any explicit request by that client, and stored local to the client. The keying dataset is not maintained at the client or at the server. If and when the client subsequently issues a request for the content dataset, the server intercepts the content dataset in response to the request, uses the content dataset to generate the keying dataset, and communicates the keying dataset to the client. The client can then use the keying dataset and the anticipatory dataset to reconstruct the content dataset for use by the client in satisfaction of the client's request.

In one set of embodiments, a method is provided. The method includes: receiving a first copy of a content dataset at a server optimizer of a communications network without a corresponding request for the content dataset from a first client terminal over the communications network; calculating an anticipatory dataset as a function of the content dataset, such that the anticipatory dataset represents at least a substantial portion of the content dataset but cannot be used to reconstruct the content dataset without a keying dataset that is also calculated from the content dataset; communicating the anticipatory dataset to the first client terminal from the server optimizer over the communications network for anticipatory storage of the anticipatory dataset local to the first client terminal; and subsequent to communicating the anticipatory dataset to the first client terminal: intercepting a second copy of the content dataset at the server optimizer, the second copy of the content dataset being communicated to the first client terminal in response to a content request issued by the first client terminal for the content dataset; calculating the keying dataset as a function of the second copy of the content dataset at the server optimizer; and communicating the keying dataset from the server optimizer to the client terminal for use by the first client terminal in locally reconstructing the content dataset as a function of the keying dataset and the anticipatory dataset.

In another set of embodiments, a server system is provided that is disposed at a server side of a communications network and in operative communications with a plurality of client terminals disposed at respective client sides of the communications network. The server system includes a server optimizer configured to: receive a first copy of a content dataset without a corresponding request for the content dataset from a first client terminal over the communications network; calculate an anticipatory dataset as a function of the content dataset, such that the anticipatory dataset represents at least a substantial portion of the content dataset but cannot be used to reconstruct the content dataset without a keying dataset that is also calculated from the content dataset; communicate the anticipatory dataset to the first client terminal from the server optimizer over the communications network for anticipatory storage of the anticipatory dataset local to the first client terminal; and subsequent to communicating the anticipatory dataset to the first client terminal: intercept a second copy of the content dataset at the server optimizer, the second copy of the content dataset being communicated to the first client terminal in response to a content request issued by the first client terminal for the content dataset; calculate the keying dataset as a function of the second copy of the content dataset at the server optimizer; and communicate the keying dataset from the server optimizer to the client terminal for use by the first client terminal in locally reconstructing the content dataset as a function of the keying dataset and the anticipatory dataset.

In yet another set of embodiments, another method is provided. The method includes: receiving an anticipatory dataset at a client terminal from a server optimizer over a communications network prior to the client terminal issuing a request for a content dataset, the anticipatory dataset calculated by the server optimizer as a function of the content dataset, such that the anticipatory dataset represents at least a substantial portion of the content dataset but cannot be used to reconstruct the content dataset without a keying dataset that is also calculated from the content dataset; storing the anticipatory dataset local to the client terminal; issuing the request for the content dataset from the client terminal over the communications network subsequent to storing the anticipatory dataset; receiving the keying dataset from the server optimizer over the communications network in response to issuing the request for the content dataset, the keying dataset calculated by the server optimizer as a function of the content dataset intercepted at the server optimizer in response to issuing the request for the content dataset; and reconstructing the content dataset at the client terminal as a function of the anticipatory dataset and the keying dataset.

In still another set of embodiments, a client system is provided that is disposed at a client side of a communications network and in operative communications with a server optimizer disposed at a server side of the communications network. The client system includes a client optimizer configured to: receive an anticipatory dataset from the server optimizer over the communications network prior to issuing a request for a content dataset, the anticipatory dataset calculated by the server optimizer as a function of the content dataset, such that the anticipatory dataset represents at least a substantial portion of the content dataset but cannot be used to reconstruct the content dataset without a keying dataset that is also calculated from the content dataset; store the anticipatory dataset local to the client optimizer; issue the request for the content dataset over the communications network subsequent to storing the anticipatory dataset; receive the keying dataset from the server optimizer over the communications network in response to issuing the request for the content dataset, the keying dataset calculated by the server optimizer as a function of the content dataset intercepted at the server optimizer in response to issuing the request for the content dataset; and reconstructing the content dataset as a function of the anticipatory dataset and the keying dataset.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
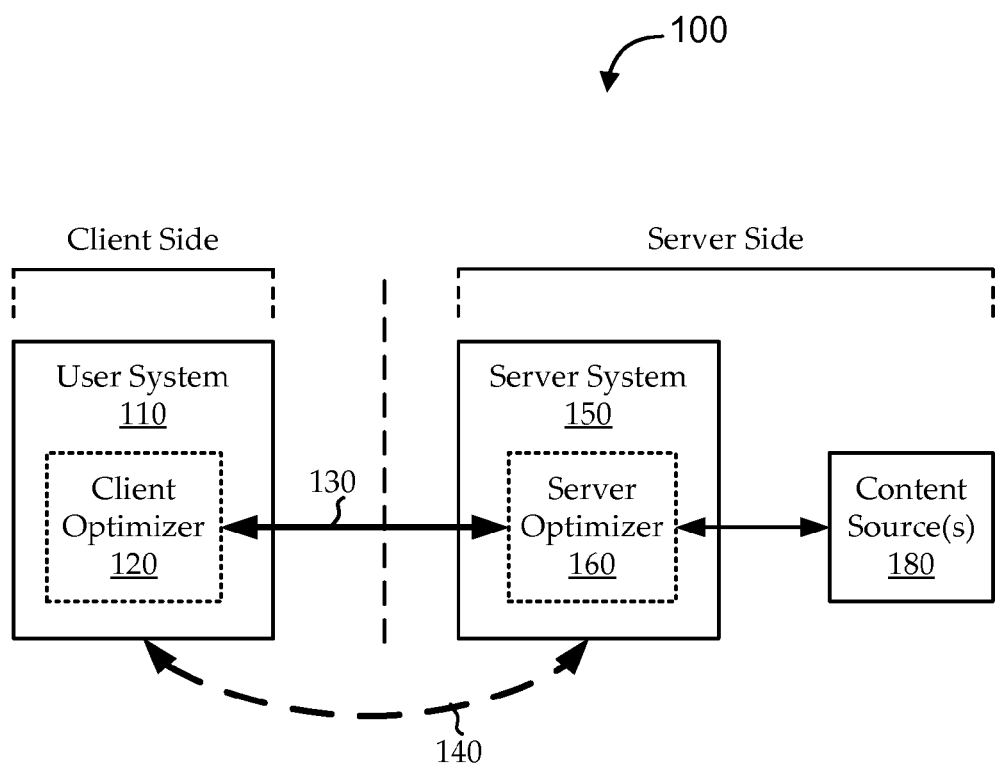
FIG. 1 shows a simplified block diagram of a communications system for use with various embodiments.

In the appended figures, similar components and/or features may have the same reference label. Further, various components of the same type may be distinguished by following the reference label by a second label that distinguishes among the similar components. If only the first reference label is used in the specification, except where otherwise noted, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

It may be desirable, for many different reasons, to anticipatorily pre-position data local to clients of a communications system. If data can be pre-positioned local to a client prior to a request for the data by the client, a future request for the data may be handled more efficiently. For example, a future request for the content may be handled using less bandwidth (e.g., with higher compression, etc.). This may provide benefit both the user (e.g., through improved system performance), the communications service provider (e.g., through more efficient usage of system resources), and/or other parties, such as content providers. In some embodiments, data is pre-positioned according to one or more so-called "deltacasting" functions, for example, as described in U.S. patent application Ser. No. 12/651,909, titled "DELTACASTING," filed on Jan. 4, 2010, which is hereby incorporated in its entirety for all purposes.

Notably, anticipatory pre-positioning systems may place data on a client system prior to any request for that data, and potentially prior to authorizing the client to receive that data (e.g., or in contravention to licensing agreements, etc.). In particular, deltacasting systems place dictionary data (e.g., data blocks) onto a customer's machine (e.g., in a client dictionary) prior to a request by the customer for the file data for which these blocks will be used to compress. A deltacasting system may operate without knowing anything about the content that is being compressed, so that it does not have full control over the content is being pre-positioned onto the client machines. If the pre-positioned data could be construed as being copies of the original file, or even as capable of generating copies of the original file, potential issues could arise.

According to one such potential issue, pre-positioning content in such a way that the client could access the content without authorization could conflict with certain rights of content owners. For example, many types of content are protected under copyright law, digital rights management, and/or other schemes. Providing and/or using the content in violation of those schemes may carry various types of liability. According to another such potential issue, certain types of content are potentially objectionable or otherwise undesirable to certain types of users. For example, it may be undesirable for customers to have access to pre-positioned data representing pornographic material, private personal data, etc.

Among other things, embodiments described herein seek to address these concerns by pre-positioning data in such a way that it is practically impossible for a client to use pre-positioned versions of content prior to an explicit request for that content by the client. To that end, self-keying techniques are presented for generating an anticipatory dataset as a function of a content dataset, such that the anticipatory dataset cannot be used to reconstruct the content dataset without a keying dataset that is also generated as a function of the content dataset. In effect, the content dataset is "self-keyed" in that it can only be reconstructed from the anticipatory dataset by using itself as the key; and the key is only generated when a request for the content is issued. Because the key cannot be generated without a fresh copy of the data sent by the content provider in response to a request by the client who will be using the key, clients are unable to access content in unauthorized or otherwise undesired ways from their locally stored anticipatory datasets.

In some embodiments, novel self-keyed encryption techniques are provided. Data encryption systems may transform blocks of data in ways that can only be reversed using one or more keys. Security vulnerabilities and legal complications may then be introduced by the availability of these keys. For example, if the keys are stored at an Internet service provider and the dictionary data is stored on a client machine, it may be possible to gain access to the key and create an unauthorized copy of a copyrighted work.

Embodiments of self-keyed encryption described herein, however, do not maintain storage of any keys for use in decrypting anticipatory data stored at the client dictionary. Rather, keying data is generated from the content data itself only after the content data is properly requested from the client (e.g., with proper credentials, etc.). For example, a digest of each block of content data is used as the key to encrypting that block of content data. The encrypted data is communicated to the client, but the original content data is discarded. It may, therefore, be impossible to generate the encryption key without re-requesting and receiving the content data from the content source.

For example, in a deltacasting system, a server optimizer intercepts and compresses content as it is being downloaded by clients of the communications system, and each client is associated with a client optimizer that decompresses the data. When the data is sent to the client in response to a request from that client for the data, keying information is also sent to the client with which the client can decompress the data. However, when the data is sent to the client without a request from that client for the data (e.g., prior to a request), keying information is not sent to the client (and may not be generated for the client) until a request for the data is received from that client.

In some embodiments, a secure unicast optimizer tunnel connects the server optimizer and client optimizer, and a multicast channel is used to exchange blocks of encrypted dictionary data. The encryption key is synthesized dynamically when the data is being compressed at the server optimizer, and the encryption key is sent to the client optimizer for use in decrypting the data block. In some embodiments, the keys are generated by the server optimizer according to data specific to the hardware and private configuration of the legitimate user. Other embodiments may generate the key further according to time stamps and/or other information. In these ways, each key may be dynamically generated in such a way that it can only be used by the legitimately requesting client (e.g., and, in some cases, in such a way that it can only be used for that particular legitimate request).

Notably, no copy of the key is stored at either end. For example, if the user wishes to access the same content a second time, the user again downloads a fresh copy from the content provider. The new download is intercepted again by the server optimizer, which uses the fresh copy of the data block to generate a new encryption key. This new key is sent over the secure unicast optimizer tunnel for use in decrypting the stored (pre-positioned) copy of the encrypted block. The decrypted, locally stored block may then be used to support compression techniques, for example, as described with reference to the "DELTACASTING" patent application incorporated above. Since no copy of the key is ever stored, a fresh download may be required for every access to the file data. The data compression system may thus preserve the relationship between rights owner (copyright owner) and consumer.

It is worth noting that, for an unauthorized access to occur, an intruder would have to intercept the unicast service flow at the server optimizer where the encryption keys are generated and sent. While this type of intrusion may be possible, it illustrates that pre-positioning the data using self-keyed encryption does not reduce the security of the data. In particular, if the intruder were able to hack into the server optimizer and intercept communication of the key to another user, the intruder could similarly intercept the service flow if no compression were used. Thus, in comparison to the uncompressed flow being sent as unencrypted data, deltacasting may even improve protection against this type of intrusion, as the deltacaster can encrypt the unicast tunnel traffic using keys specific to the hardware and private configuration of the legitimate user.

Other embodiments use self-keyed data hold-back techniques to implement the self-keying functionality described herein. As described above with reference to the self-keyed encryption embodiments, content data is intercepted at the server optimizer and a determination is made to pre-push the content. A technique is applied to the content dataset to remove ("hold-back") a portion of the data. Notably, the technique is designed so that the remaining portion of the dataset (i.e., without the held back bytes) is unusable as is, and there would be no simple mechanism for using the remaining portion of the data to reconstruct the content dataset without having the content dataset to regenerate the held back data. Further, typical implementations of the hold-back technique will hold back only a relatively small portion of the content dataset, so that the benefits from pre-pushing the data can by maximized. For example, certain types of files may be effectively unusable even if only one out of every millionth bytes is removed.

When the data is sent to the client in response to a request from that client for the data, held back data is also sent to the client with which the client can reconstruct the data. However, when the data is sent to the client without a request from that client for the data (e.g., prior to a request), the held back data information is not sent to the client (and may not be generated for the client) until a request for the data is received from that client. As with the self-keyed encryption embodiments, this may secure both the transmission and anticipatory storage of the data, as may be desired by the content providers. For example, to obtain the full content dataset, an intruder would have to hack both the transmission of the remaining (not held back) data and the transmission of the held back data to a requesting client, or the intruder would have to hack the content source. Either way, this may not reduce (and may even increase) the security of the content dataset.

Turning first to FIG. 1, a simplified block diagram is shown of a communications system 100 for use with various embodiments. The communications system 100 facilitates communications between a user system 110, a server system 150, and one or more content sources 180 via a client optimizer 120 and a server optimizer 160. Embodiments of the user system 110 include any component or components for providing a user with network interactivity. For example, the user system 110 may include any type of computational device, network interface device, communications device, or other device for communicating data to and from the user.

The communications system 100 facilitates communications between multiple user systems 110 and a variety of content sources 180 (only one of each is shown for the sake of clarity). The server system 150 may be in communication with content sources 180 directly or via a network. For example, the server optimizer 160 may be located in a gateway that includes content or application servers, the server optimizer 160 may be in communication with content sources 180 via the Internet, etc. In one set of embodiments, content sources 180 may include one or more Content Distribution Network (CDN) nodes that are internal or external to a local network comprising server system 150. As used herein, "content sources" is intended broadly to include any source of content in which the users may be interested. For example, a content source 180 may provide website content, television content, file sharing, multimedia serving, voice-over-Internet-protocol (VoIP) handling, and/or any other useful content.

A communications link 130 is also shown between the server system 150 and the user system 110. The communications link 130 may include one or more networks, nodes, links, etc. For example, communications may occur over the Internet, Internet protocol ("IP") networks, intranets, wide-area networks ("WANs"), local-area networks ("LANs"), virtual private networks ("VPNs"), the Public Switched Telephone Network ("PSTN"), and/or any other type of network, wired and wireless connections, etc. Further, as described more below, the communications link 130 can be used to provide unicast, multicast, point-to-multipoint, broadcast, and/or any other useful type of communications among its nodes and/or end points.

The client optimizer 120 and the server optimizer 160 are configured to effectively provide an optimizer link 140 between the user system 110 and the server system 150, including providing certain communications functionality. While the optimizer link 140 is shown separate from the communications link 130, the optimizer link 140 functionality is, in fact, implemented over the communications link 130. Embodiments of the optimizer functionality (e.g., the server optimizer 160, the client optimizer 120, and the resulting optimizer link 140) can be implemented in a number of ways without departing from the scope of the invention. In some embodiments, optimizer components are implemented as proxies, such that the server optimizer 160 is a proxy server, the client optimizer 120 is a proxy client, and the optimizer link 140 is a proxy tunnel. For example, a transparent intercept proxy can be used to intercept traffic in a way that is substantially transparent to users at the client-side of the proxy tunnel.

In other embodiments, the optimizer is implemented as an in-line optimizer. For example, the client optimizer 120 is implemented within a user terminal and the server optimizer 160 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 160 are implemented in the Internet cloud (e.g., on commercial network leased server space). Embodiments of the client optimizer 120 are implemented within a user's personal computer, within a user's modem, in a physically separate component at the customer premises, etc.

In certain embodiments, the server optimizer 160 acts as a transparent man-in-the-middle to intercept the data as it passes between the user system 110 and the content sources 180. Some purposes of the interception may include filtering, caching, parsing, and/or otherwise processing the requests and responses. For example, when the user system 110 requests a web object from a content source 180, the server optimizer 160 may intercept and parse the request to implement prefetching and/or other types of functionality. This and/or other types of functionality are implemented, at least in part, by using the optimizer link 140 functionality.

Figure 2:
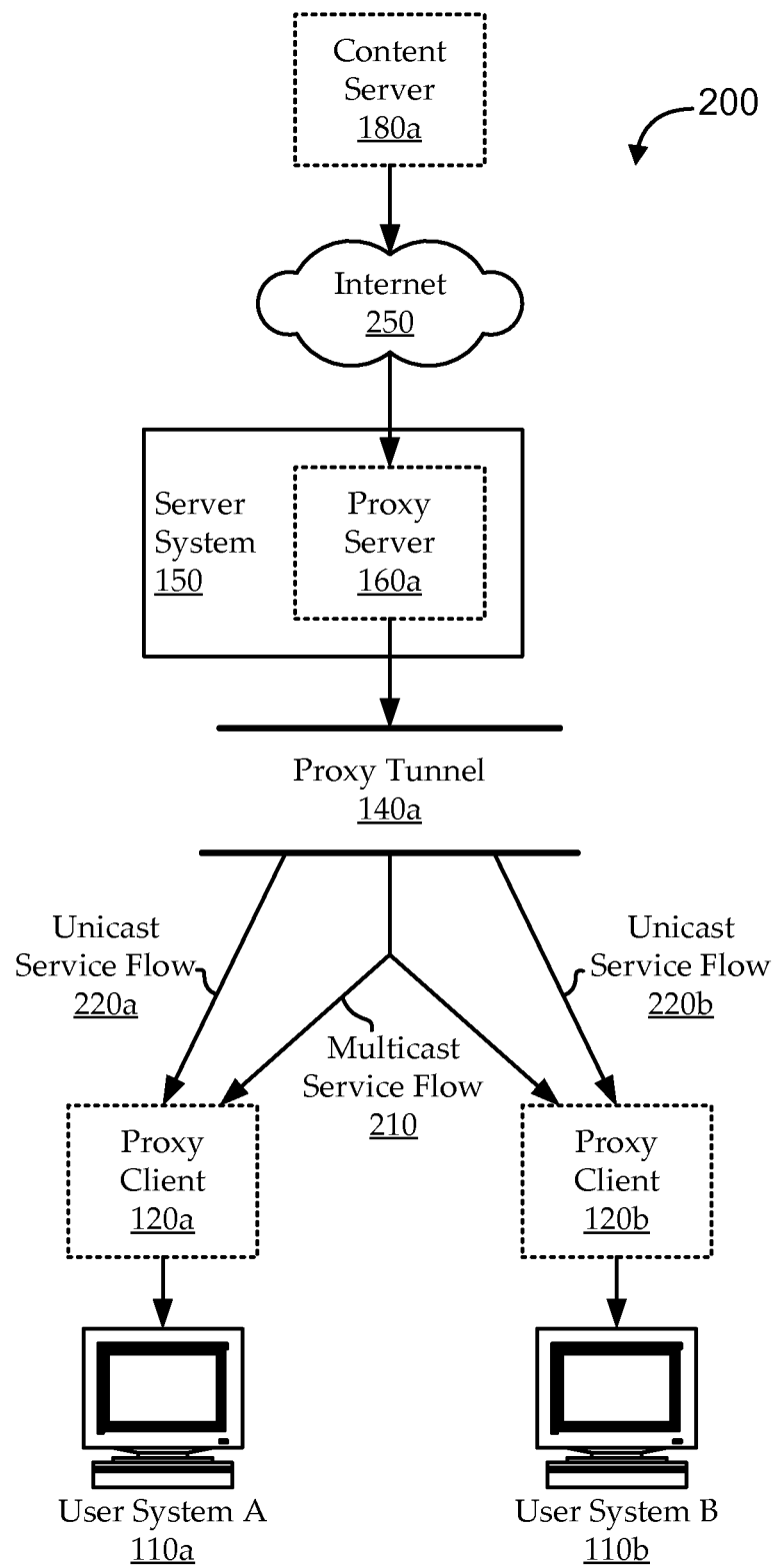
FIG. 2 shows a simplified block diagram of an illustrative embodiment of a communications system, like the communications system of FIG. 1.

For the sake of added clarity, some such functionality is described in the context of an illustrative embodiment of the communications system 100. FIG. 2 shows a simplified block diagram of an illustrative embodiment of a communications system 200, like the communications system 100 of FIG. 1. The communications system 200 includes two user systems (i.e., 110a and 110b) implementing client optimizers as respective proxy clients (i.e., 120a and 120b), and a server system 150 implementing a server optimizer as a proxy server 160a. The proxy clients 120a and 120b are in communication with the proxy server 160a over a proxy tunnel 140a (i.e., an implementation of the optimizer link 140 of FIG. 1). The proxy server 160a is also in communication, over the Internet 250, with a content server 180a (i.e., as an implementation of a content source 180 of FIG. 1).

The proxy tunnel is configured to provide multicast service flows 210 and unicast service flows 220. As used herein, "multicast" is intended to broadly include any one-to-multiple type of communications, such as broadcast, multicast, point-to-multipoint, etc. For example, in a satellite communications system, all communications may effectively be broadcast over the air from the satellite transmitter. Accordingly, multicast, unicast, or other communications functionality may be implemented using protocols, and/or other techniques that direct the receiver to "listen" only for particular communications. In one embodiment, a multicast protocol is used for multicast communications that allows receivers to subscribe to a multicast service flow, and a unicast protocol is used for unicast communications that allows private IP communications to be effectuated.

According to some implementations, unicast and/or multicast functionality is used to implement certain anticipatory pre-pushing of content. Many different scenarios may exist in which it is desirable to pre-push content to a client. To illustrate one such scenario, suppose that User System A 110a requests Content A (e.g., a web object), and it is determined that User System B 110b is likely to also request Content A subsequently. For example, the content is determined to be popular (e.g., a viral video), the content is determined to be an upgrade or service pack update to an application installed on User System B 110b, the content is similar to other content recently downloaded by User System B 110b, etc. While communicating the content to User System A 110a, it may be desirable to concurrently communicate the content to User System B 110b. For example, in a satellite communications system, substantially the same bandwidth may be used when sending the content to one or to all clients (e.g., though other considerations, like a limit on the number of concurrent multicast channels allowed, may restrict the system from using multicast functionality in some cases).

To illustrate another such scenario, suppose that User System A 110a requests Content A (e.g., a web object), and it is determined that User System A 110a is likely to request Content A again, subsequently. For example, the content is determined to be a song from a streaming Internet music station, and each song has a certain likelihood of being played again on the same station for the same client. While communicating the content to User System A 110a as an authorized content dataset (e.g., over a unicast service flow 220a), it may be desirable to concurrently communicate an anticipatory dataset of the content to User System A 110*a* for anticipatory storage (e.g., as a unicast service flow 220*a* or multicast service flow 210).

To illustrate yet another such scenario, suppose that the network over which the proxy tunnel 140*a* is implemented has periods of underutilization (e.g., average network usage is significantly reduced between 1:00 and 5:00 in the morning). It may be desirable to develop an anticipatory download list for clients and/or groups of clients, and to pre-push the content identified on that list during the underutilization periods. This may, for example, help improve network load balancing.

In any of the above or other types of scenarios, it is determined to push content to a user system 110 without any explicit request for the content from the user system 110. As discussed above, at least two features may be desirable. One feature is that enough of the content is pre-pushed to the client so that the risk of pre-pushing content if it is not ultimately requested is offset by the benefit of pre-pushing the content if it is ultimately requested. For example, pre-pushing a small portion of the content dataset may not provide sufficiently large benefits, while certain benefits may be optimized by pre-pushing all or most (e.g., a substantial portion) of the content dataset to the client.

Another feature is that, having anticipatorily stored data at the client, the data practically cannot be used by the client to reconstruct the content dataset without the client first issuing a proper request for the content to the content source. For example, suppose a client receives and stores an anticipatory dataset representing a movie file offered on a subscription basis by a website. It may be desirable to force the client to request the movie from the website and to use that request to generate keying data with which the client can use the locally stored version of the movie file. It will be appreciated that, in this way, the anticipatory storage may be transparent to the client, so that the client's experience is substantially unaffected, other than the content being delivered more quickly. For example, the client goes to the same website (i.e., regardless of pre-pushing of the content), provides credentials in the same way, requests the movie in the same way, and receives the movie through the same interface; the only difference being how the movie data is delivered to the client over the network.

Figure 3:
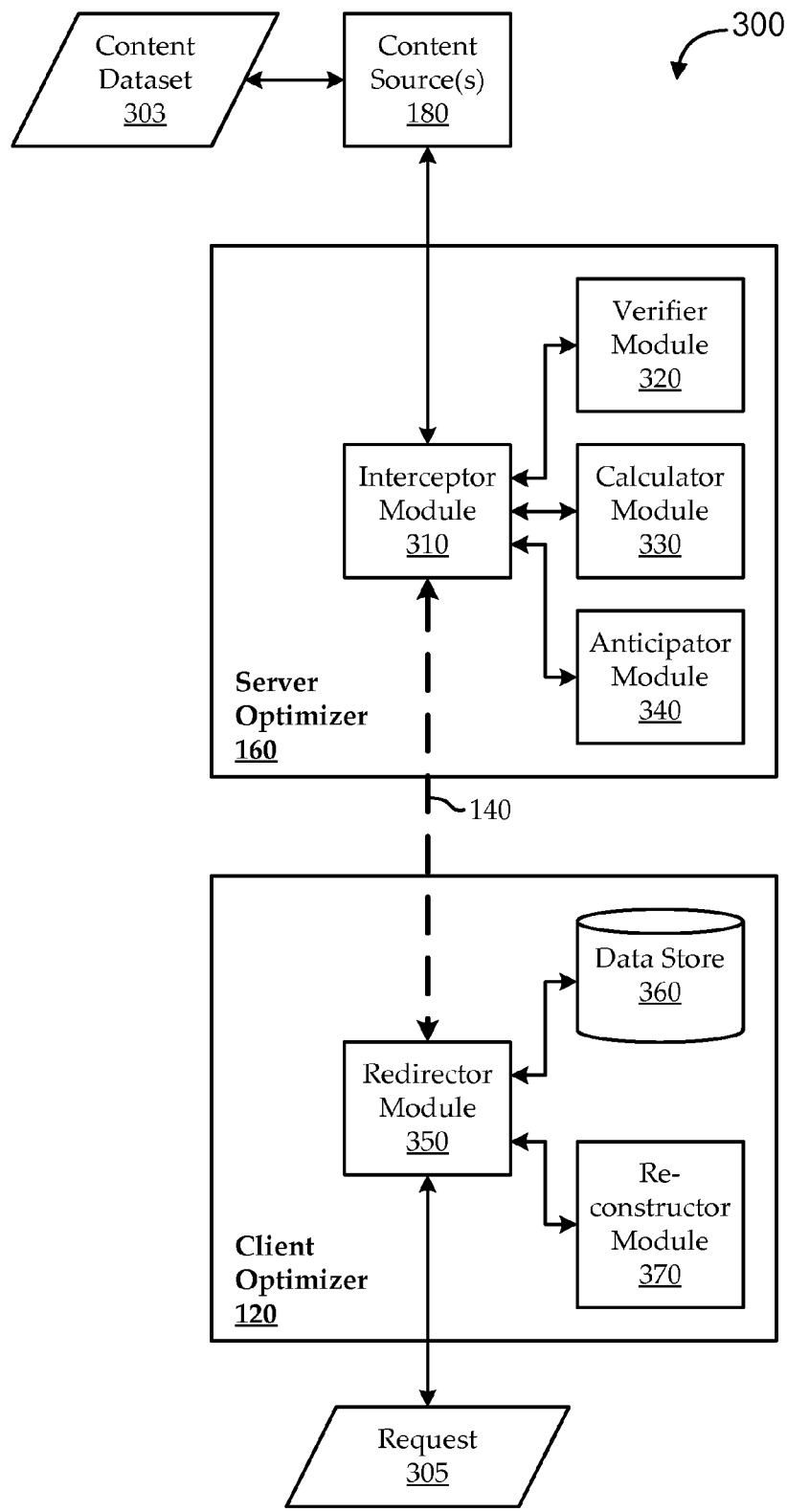
FIG. 3 shows a simplified block diagram of an illustrative communications system having a client-server framework for use with various embodiments.

As described above, embodiments are implemented in a client-server framework. FIG. 3 shows a simplified block diagram of an illustrative communications system 300 having a client-server framework for use with various embodiments. As described above with reference to FIGS. 1 and 2, a client optimizer 120 is in communication with a server optimizer 160 over an optimizer link 140, and the server optimizer 160 is in further communication with one or more content sources 180. For example, a proxy client is on a client side of a satellite communications system, a proxy server is on a server side of the satellite communications system, an optimizer tunnel is implemented over the satellite link, and the proxy server is in communication with the Internet backbone via a satellite gateway.

For the sake of illustration, embodiments of techniques described above will be further described in the context of the communications system 300. A content dataset 303 is communicated from a content source 180 and intercepted by an interceptor module 310 of the server optimizer 160. It is assumed, at this point, that no request 305 has been issued by a user (e.g., user system) associated with the client optimizer 120 (though the content dataset 303 may have been received in response to a request from another user associated with another client optimizer (not shown)).

The interceptor module 310 is in communication with various functional blocks of the server optimizer 160. As illustrated, the functional blocks may include a verifier module 320, a calculator module 330, and an anticipator module 340. Embodiments of the verifier module 320 determine whether the intercepted content dataset 303 is the same as data (e.g., data blocks) currently stored in a client dictionary (e.g., in data store 360). Embodiments of the calculator module 330 calculate encrypted data blocks and keys for self-keyed encryption functionality and/or hold-back and remaining datasets for self-keyed data hold-back functionality. Embodiments of the anticipator module 340 determine whether to anticipatorily communicate data to one or more clients, including the client optimizer 120.

For example, the verifier module 320 determines that the content dataset 303 (or some corollary to the content dataset 303, like a previously generated anticipatory dataset) is not present in the data store 360 of the client optimizer 120 (e.g., in the client dictionary). The anticipator module 340 determines that it is desirable to pre-push an anticipatory version of the content dataset 303 to the client optimizer 120. For example, the anticipator module 340 uses a cost-benefit analysis to determine that, based on a probability that the content will ultimately be requested, costs of pre-pushing the content are outweighed by benefits of pre-pushing the content. Having determined that the content is not already at the client optimizer 120 and that it would be desirable for the content to anticipatorily be at the client optimizer 120, the calculator module 330 generates an anticipatory dataset for communication to the client optimizer 120. As described above, the anticipatory dataset can be communicated over the optimizer link 140 as part of a multicast and/or unicast service flow.

The anticipatory dataset is received by a redirector module 350 of the client optimizer 120. The redirector module 350 is in communication with various functional blocks of the client optimizer 120. As illustrated, the functional blocks may include a data store 360 and a reconstructor module 370. The anticipatory dataset may be stored in the data store 360.

At some subsequent time, a request 305 is issued for the content dataset 303 from the content source 180. The request 305 is intercepted at the client optimizer 120 by the redirector module 350 and communicated, via the optimizer link 140, to the server optimizer 160. The content dataset 305 is again intercepted from the content source 180 by the interceptor module 310 of the server optimizer 160.

This time, the verifier module 320 determines that the content dataset 303 (or, actually, the anticipatory dataset corresponding to the content dataset 303) is already present in the data store 360 of the client optimizer 120. Further, it may be determined in some configurations, that the anticipatory dataset stored at the client optimizer 120 was generated by a particular self-keying technique (e.g., according to a particular self-keyed encryption or hold-back technique). Accordingly, the calculator module 330 uses the new copy of the content dataset 303 to generate keying data for communication to the client optimizer 120. For example, the keying data includes a decryption key, a hold-back portion of the content dataset 303, etc. Typically, the keying dataset is communicated over the optimizer link 140 as part of a private unicast service flow only to the requesting user (or users).

In some configurations, if a user requests content for which an anticipatory dataset was not previously received and locally stored, the entire content dataset 303 is communicated without using the self-keying techniques described herein. In other configurations, even in that scenario, the anticipatory dataset is communicated to the requesting user (e.g., via a unicast or multicast service flow), and the keying dataset is also communicated to the requesting user (e.g., via a private unicast service flow). Notably, in response to the request 305, the client optimizer 120 may have access to both the anticipatory dataset and the keying dataset.

Embodiments of the reconstructor module 370 are configured to reliably reconstruct the requested content dataset 305 as a function of the anticipatory dataset and the keying dataset. In some configurations, the reconstructor module 370 uses the keying dataset to decrypt the encrypted data blocks of the anticipatory dataset. In other configurations, the keying dataset includes held-back data that is used by the reconstructor module 370 to fill in corresponding missing portions of the anticipatory dataset, which is the remaining (not held-back) portion of the content dataset 305. The reconstructed version of the content dataset 305 can then be used by the requesting client.

Embodiments of self-keying techniques are further described below as methods of FIGS. 4-7. It will be appreciated that the systems above can be used to implement many types of functionality including techniques described herein, and techniques described herein can be implemented on systems other than those described above. Accordingly, while embodiments of the methods described below may construed in context of system embodiments described above, the methods should not be limited to those constructions.

Figure 4:
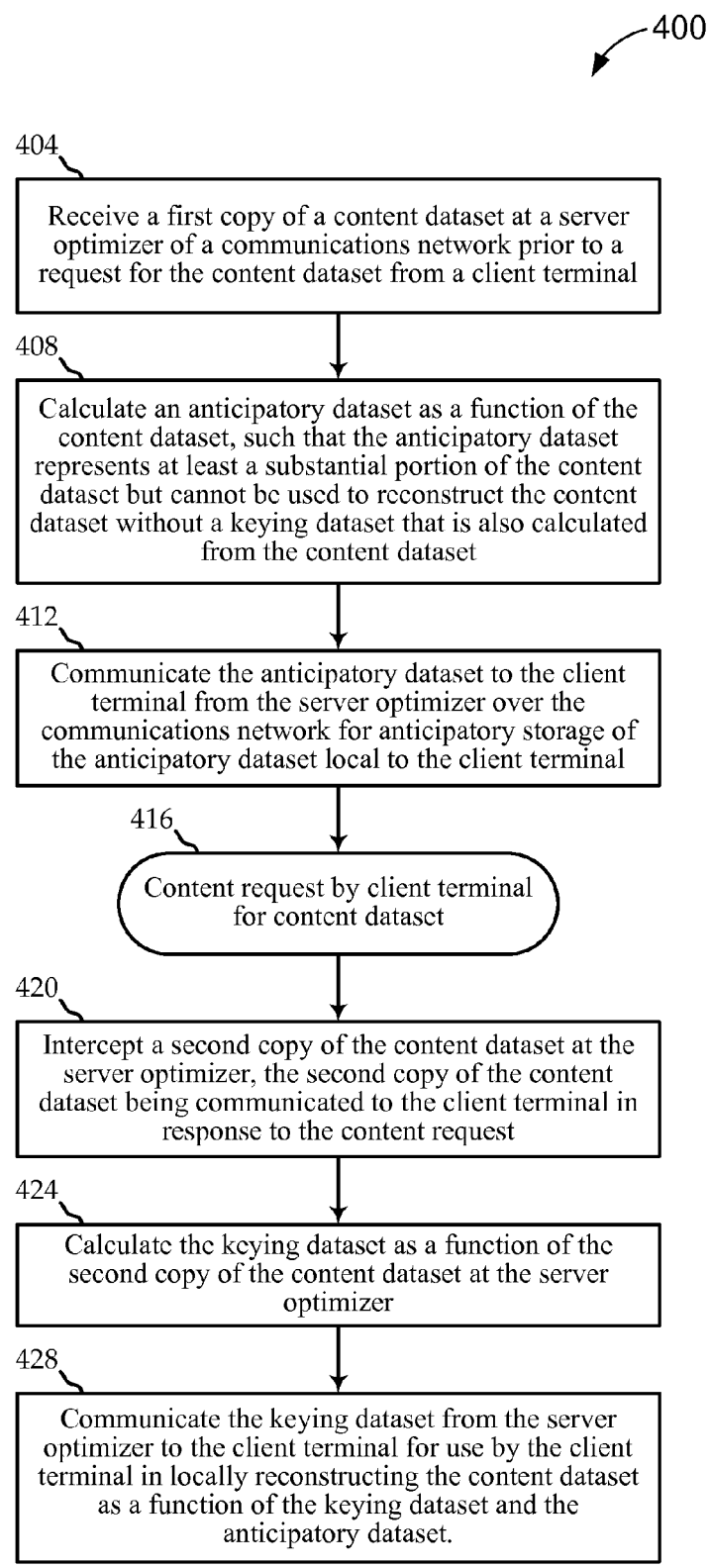
FIG. 4, a flow diagram is shown of an illustrative method for server-side handling of anticipatory content using self-keying techniques, according to various embodiments.

Turning to FIG. 4, a flow diagram is shown of an illustrative method 400 for server-side handling of anticipatory content using self-keying techniques, according to various embodiments. The method 400 begins at stage 404 by receiving a copy of a content dataset at a server optimizer of a communications network without a corresponding request for the content dataset from a client terminal over the communications network. For example, the first copy of the content dataset is received in response to a request for the content from a different client terminal, and it is determined that the content should be anticipatorily provided to the non-requesting client terminal.

At stage 408, an anticipatory dataset is calculated as a function of the content dataset. As described above, the anticipatory dataset represents at least a substantial portion of the content dataset but cannot be used to reconstruct the content dataset without a keying dataset that is also calculated from the content dataset. The anticipatory dataset is then communicated at stage 412 to the client terminal from the server optimizer over the communications network for anticipatory storage of the anticipatory dataset local to the client terminal.

Subsequently, the client terminal issues a request for the content (illustrated as stage 416). In response to that request, another copy of the content dataset is communicated to the client terminal from a content source. At stage 420, the second copy of the content dataset is intercepted at the server optimizer. The server optimizer then calculates the keying dataset as a function of the second copy of the content dataset at stage 424. At stage 428, the keying dataset is communicated from the server optimizer to the client terminal for use by the client terminal in locally reconstructing the content dataset as a function of the keying dataset and the anticipatory dataset.

Figure 5A:
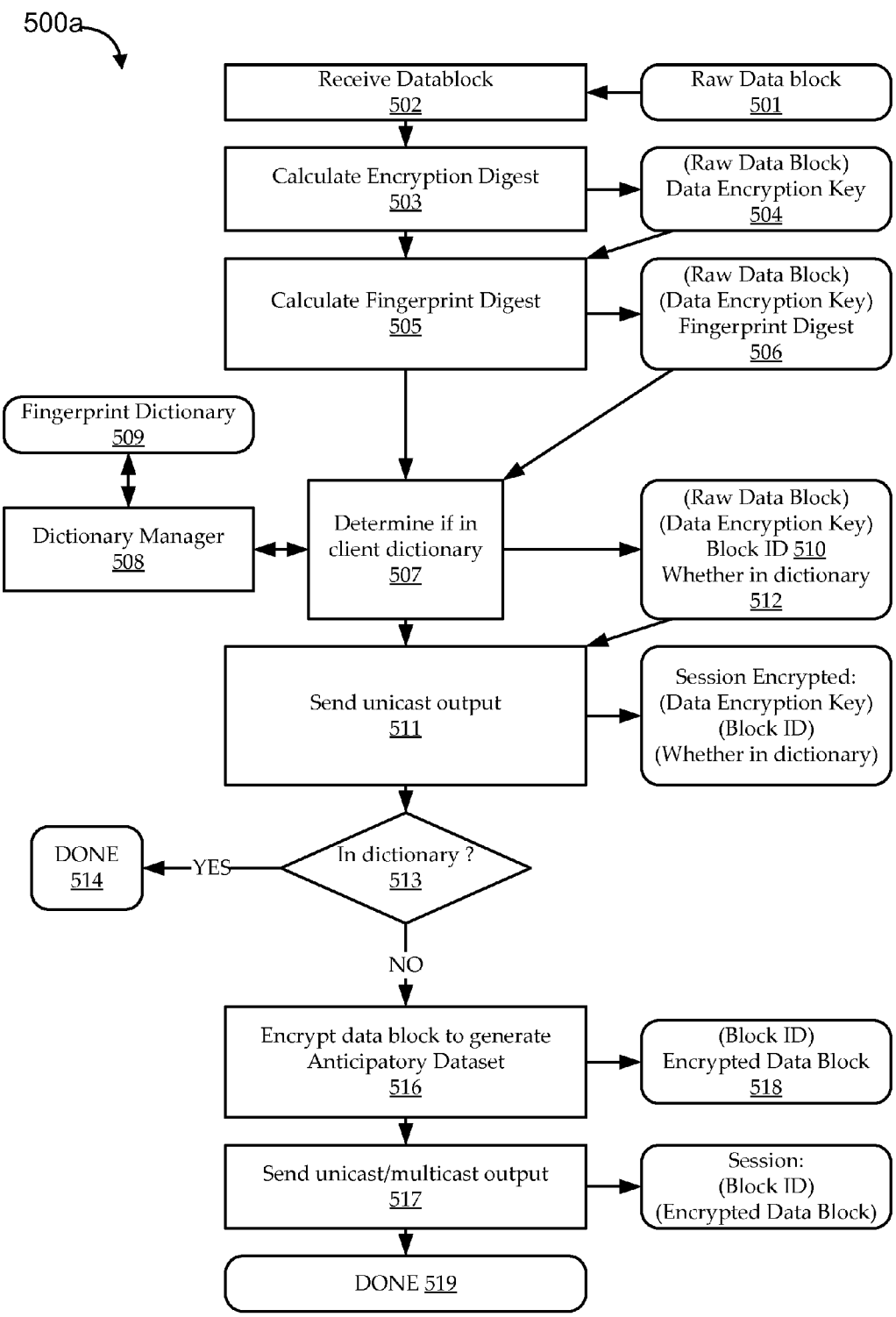
FIG. 5A shows a flow diagram of an illustrative method for server-side handling of anticipatory content using an embodiment of a self-keyed encryption technique.
Figure 5B:
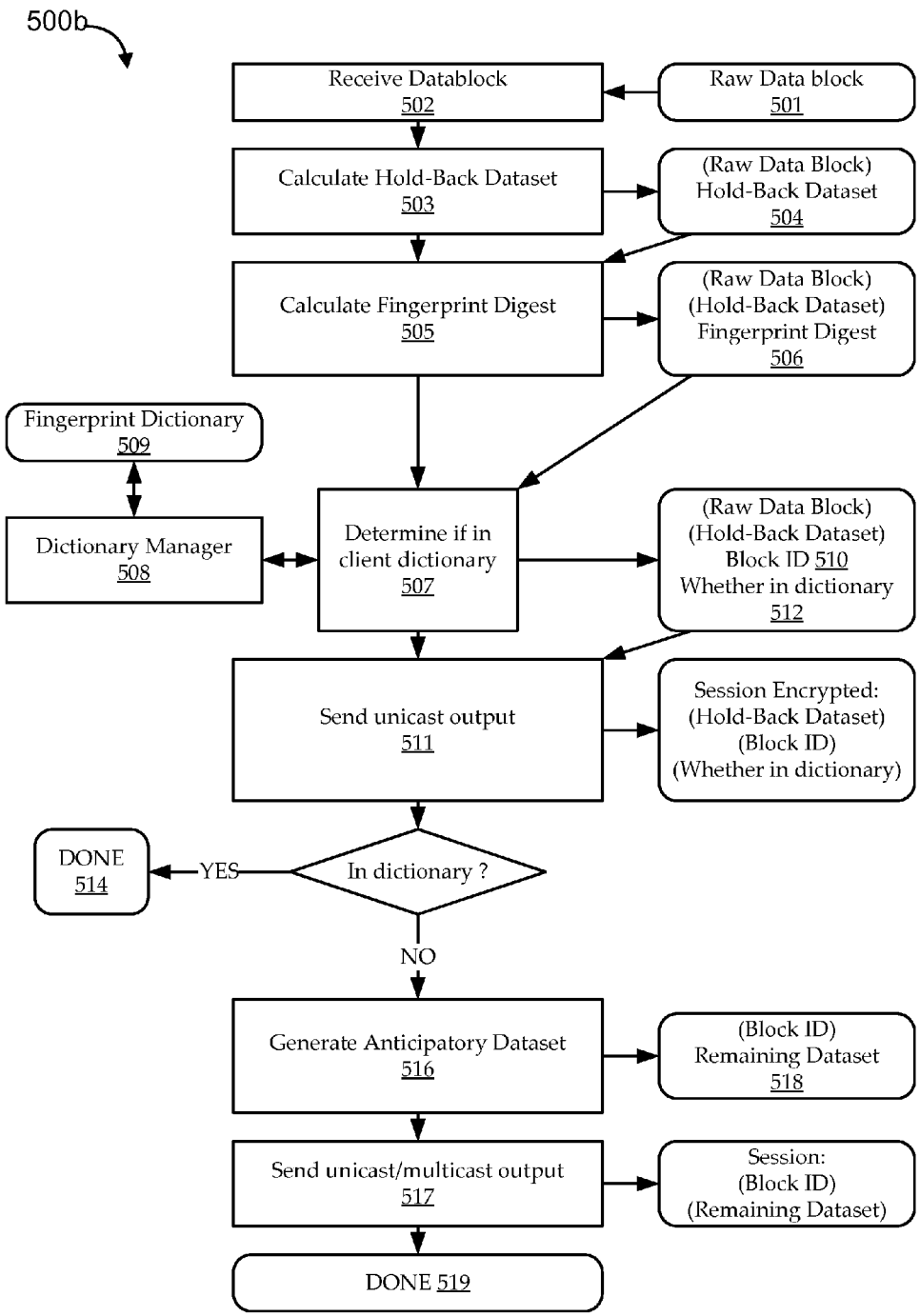
FIG. 5B shows a flow diagram of an illustrative method for server-side handling of anticipatory content using an embodiment of a self-keyed data hold-back technique.

As described above, various techniques can be used to implement the functionality of the method 400. For example, self-keyed encryption and/or self-keyed data hold-back techniques can be used. FIGS. 5A and 5B illustrate embodiments of these self-keyed encryption and self-keyed data hold-back techniques, respectively.

FIG. 5A shows a flow diagram of an illustrative method 500a for server-side handling of anticipatory content using an embodiment of a self-keyed encryption technique. It is assumed, for the sake of illustration, that one client requested content, and it has been determined to anticipatorily multicast that content to other, non-requesting clients. The method 500a begins at stage 502 by receiving a raw data block 501 (e.g., from a content source over the Internet). This block may be from a file, media stream, or any other type of data. The file data may be encrypted itself using keys inaccessible to the server optimizer, in which case the server optimizer algorithms can be applied with equal effectiveness to the pre-encrypted data, as long as the same encrypted data is downloaded each time the file is accessed. The block may contain the entire file, or just a segment from it.

The server optimizer may apply protocol-specific transforms to extract the file data from the network protocols, such as HTTP. In some implementations, the network protocol uses encryption that is specific to each download of the file, such as HTTPS, in which case the server optimizer may use various techniques to allow the encrypted data to be accelerated effectively. For example, the acceleration can be implemented through a proxy tunnel or other optimizer link.

In some embodiments, the server optimizer calculates two separate digests from the file data. A digest is a sequence of bytes such that two identical files will always produce the same digest, but the two different files will usually produce different digests. Examples of algorithms to create digests included CRC and MD5. The probability of two different files producing the same digest typically approaches $2^{-N}$, where N is the number of bits in the digest.

At stage 503, an encryption digest is calculated and used to create a unique encryption key 504 that will be used to encrypt the raw data block 501. For example, the digest may be used as the seed for an AES encryptor as described in RFC2898. In addition to the encryption digest calculated at stage 503, a block ID may be calculated at stage 505. The block ID is illustrated as a fingerprint digest 506, but may be any type of block identifier that is useful for determining whether a particular block is a match for other (e.g., subsequent) blocks.

In certain configurations, fingerprinting procedures are performed in various ways, for example, according to different delta coding algorithms as discussed in the "DELTA-CASTING" application incorporated by reference above. The fingerprint digest 506 may be a single sequence of bytes, or part of a more complex system for determining whether two blocks match. For example, it may be important to identify when the exact same sequence of bytes is received by the server optimizer. Embodiments of the server optimizer use the same block boundaries as when calculating the encryption digest 504, so that the encryption digest 504 can reliably be applied to the same sequence of bytes.

As discussed above, it is desirable for the encryption digest 504 and the fingerprint digest 506 to be calculated in a manner that prevents the encryption digest 504 from being determined as a function of the fingerprint digest 506. In some embodiments the fingerprint digest 506 is maintained persistently on the server optimizer (e.g., to allow synchronization with the client dictionary, so that it can be determined when data blocks are already stored local to the client). However, embodiments seek to prevent the storage of any information that would allow the encryption digest 504 to be discovered without an appropriate request for the content from the content source. According to one technique, the digests are calculated using completely independent generators.

At stage 507, the method 500a determines whether the data is already in the client dictionary (e.g., in storage local to the client optimizer). For example, as illustrated, a dictionary manager 208 maintains a list of the fingerprint digests 506 for all blocks in the client fingerprint dictionary 209. The fingerprint digest 506 of the block is matched against those of the stored blocks. If the new block matches an earlier block, the block ID of the old block is returned and the availability of the block is noted. In some embodiments, the block ID is the fingerprint digest 506. In other embodiments, the block ID is a shorthand reference to a fingerprint digest. For example, the fingerprint digest 506 may be a 16-byte MD5 value, but the block ID might be a 4-byte integer that is incremented when blocks are added to the dictionary. The shorthand may allow for more efficient exchange of keys.

Having determined whether the data is present in the client dictionary at stage 507, various data may be available, including the raw data block 501, the encryption digest 504, the fingerprint digest 506, a determination of whether the data is in the client dictionary (e.g., a "Whether in dictionary" flag 512), and, if so, a block ID 510. As discussed above, determinations may be made in some cases as to whether the data is in various client dictionaries. For example, a determination may be made for each client being evaluated for participation in the multicast. However, in the embodiment illustrated by FIG. 5A, the determination at stage 507 is whether the data is already in the requesting client's dictionary.

Because there is a requesting client, it is desirable to send the requesting client any data needed to reliably reconstruct the requested content dataset. At stage 511, the generated encryption digest 504 is unicast to the requesting client. If the data was determined to be in the client dictionary (e.g., as indicated by the "Whether in dictionary" flag 512), the unicast communication may include the block ID 510. Sending the block ID 510 to the requesting client may allow the requesting client's client optimizer to efficiently find the corresponding blocks of data stored locally.

At stage 513, the method 500*a* branches according to whether the data block was determined to be in the requesting client's dictionary (e.g., as indicated by the "Whether in dictionary" flag 512). Notably, a determination that the data is stored local in the requesting client's dictionary is assumed for the sake of this illustrative case to actually be a determination that an anticipatory dataset corresponding to the content data (e.g., a version of the fingerprint digest 506) was previously pre-pushed to the requesting client prior to this request. Accordingly, after communicating the encryption digest 504 to the requesting client (e.g., via a private unicast service flow, according to stage 511), the requesting client has both the anticipatory dataset and the keying dataset (i.e., the encryption digest 504). The requesting client's client optimizer can then reconstruct the requested content dataset as a function of the anticipatory dataset and the keying dataset by using the encryption digest 504 to decrypt the locally stored anticipatory dataset. As such, the method 500*a* may terminate at stage 514.

In the event that the data block is not currently in the requesting client's dictionary (e.g., or, possibly, if there was no requesting client), the raw data blocks 501 are encrypted according to the encryption digest 504 to generate encrypted data blocks 518 at stage 516. As discussed above, the encrypted data blocks 518 are the anticipatory dataset, and are generated such that they cannot be decrypted without the encryption digest 504. Further, the encryption digest 504 is created again only when there is another request for and receipt of the raw data blocks 501 at the server optimizer. According to some configurations, the encryption at stage 516 is performed using an algorithm seeded by the previously calculated encryption digest 504. If the data is compressible, such as a text file, it may be advantageous to also apply a local data compression such as a LZ77 or LZP algorithm to the block prior to the compression. However, in many cases, large blocks of data traversing the Internet are already compressed, and may render additional compression stages unnecessary or undesirable.

At stage 517, a unicast and/or multicast service flow is used to communicate the anticipatory dataset to the requesting and/or non-requesting clients. In some configurations, a block ID is also sent. For example, the fingerprint digest is stored in a server dictionary along with a block ID that matches the block ID of the client dictionary to aid in synchronization with and identification of client dictionary contents. The output of stage 517 may also include other components such as metadata or stream identifiers, as discussed, for example, in DELTACASTING patent incorporated by reference above.

Notably, after the communication at stage 517 any client participating in the multicast service flow, which may include both requesting and non-requesting clients, may have locally stored copies of the encrypted data blocks 518. However, only requesting clients will also have the encryption digest 504 for decrypting them. In some configurations, when the raw data blocks 501 have been processed, the raw data blocks 501 and the encryption digests 504 are erased, so that the server optimizer does not have any way to generate the original dataset or to regenerate the encryption digests 504. Also, in some configurations, after the decrypted data is emitted by the client optimizer, the encryption digest 504 is deleted, so that the client also does not have the information needed to generate another copy of the block unless a fresh copy is downloaded from the content server. The fingerprint digests 506 and block IDs may be stored in the dictionary as needed to support various functions. The method 500*a* may then terminate at block 519.

FIG. 5B shows a flow diagram of an illustrative method 500*b* for server-side handling of anticipatory content using an embodiment of a self-keyed data hold-back technique. Much of the method 500*b* is similar to the method 500*a*, and similar stages have been identified with corresponding reference numbers for the sake of illustration and clarity. As in FIG. 5A, the method 500*b* begins at stage 502 by receiving a raw data block 501.

At stage 553, a hold-back dataset 554 is calculated by extracting some portion of data from the raw data blocks 501. For example, data may be held back at a certain frequency (e.g., every thousandth byte), in a certain pattern, etc. As discussed above, the hold-back dataset 554 is created in such a way and to such an extent that the remaining dataset (i.e., the data not held back) cannot be used to reconstruct the original raw data blocks 501 without having the hold-back dataset 554. As described with reference to FIG. 5A, a fingerprint digest 506 may also be calculated at stage 505. The fingerprint digest 506 may be any type of block identifier that is useful for determining whether a particular block is a match for other (e.g., subsequent) blocks.

Similar to stages 507-511 of FIG. 5A, the method 500*b* determines in corresponding stages whether the data is already in the requesting client's dictionary (e.g., by checking a server-side model of the client's dictionary 509 using a dictionary manager 508, and by setting a "Whether in dictionary" flag 512), determines a block ID 510 in certain configurations, and communicates the hold-back dataset 554 as a unicast service flow to the requesting client. If the data was determined to be in the client dictionary (e.g., as indicated by the "Whether in dictionary" flag 512), the unicast communication may include the block ID 510. Sending the block ID 510 to the requesting client may allow the requesting client's client optimizer to efficiently find the corresponding blocks of data stored locally.

At stage 513, the method 500b branches according to whether the data block was determined to be in the requesting client's dictionary (e.g., as indicated by the "Whether in dictionary" flag 512). Notably, a determination that the data is stored local in the requesting client's dictionary is assumed for the sake of this illustrative case to actually be a determination that an anticipatory dataset corresponding to the content data was previously pre-pushed to the requesting client prior to this request. Accordingly, after communicating the hold-back dataset 554 to the requesting client (e.g., via a private unicast service flow, according to stage 511), the requesting client has both the anticipatory dataset and the keying dataset (i.e., the remaining dataset as the fingerprint digest 506 and the encryption digest 504, respectively). The requesting client's client optimizer can then reconstruct the requested content dataset as a function of the anticipatory dataset and the keying dataset by using the hold-back dataset 554 to fill-in held-back portions of the locally stored remaining dataset. As such, the method 500b may terminate at stage 514.

In the event that the data block is not currently in the requesting client's dictionary (e.g., or, possibly, if there was no requesting client), an anticipatory dataset is generated at stage 556 by holding back data equivalent to the hold-back dataset 554 from the raw data blocks 501 to leave a remaining dataset 558. At stage 517, a unicast and/or multicast service flow is used to communicate the anticipatory dataset to the requesting and/or non-requesting clients. In some configurations, a block ID and/or other data (e.g., metadata, stream identifiers, etc.) are also communicated at stage 517.

Notably, after the communication at stage 517 any client participating in the multicast service flow, which may include both requesting and non-requesting clients, may have locally stored copies of the remaining dataset 518. However, only requesting clients will also have the hold-back dataset 554 for filling in the held back data to reconstruct the requested content dataset. In some configurations, when the raw data blocks 501 have been processed, the raw data blocks 501 and the hold-back dataset 554 are erased, so that the server optimizer does not have any way to generate the original dataset or to regenerate the hold-back dataset 554. Also, in some configurations, after the reconstructed data is emitted by the client optimizer, the hold-back dataset 554 is deleted, so that the client also does not have the information needed to generate another copy of the block unless a fresh copy is downloaded from the content server. The fingerprint digests 506 and block IDs may be stored in the dictionary as needed to support various functions. The method 500b may then terminate at block 519.

The methods discussed above with reference to FIGS. 4, 5A, and 5B describe server-side handling functionality. Additional functionality is implemented in various embodiments at the client side to handle reconstruction of the content dataset after processing according to the self-keying techniques. Embodiments of these client side techniques are described with reference to FIGS. 6 and 7.

Figure 6:
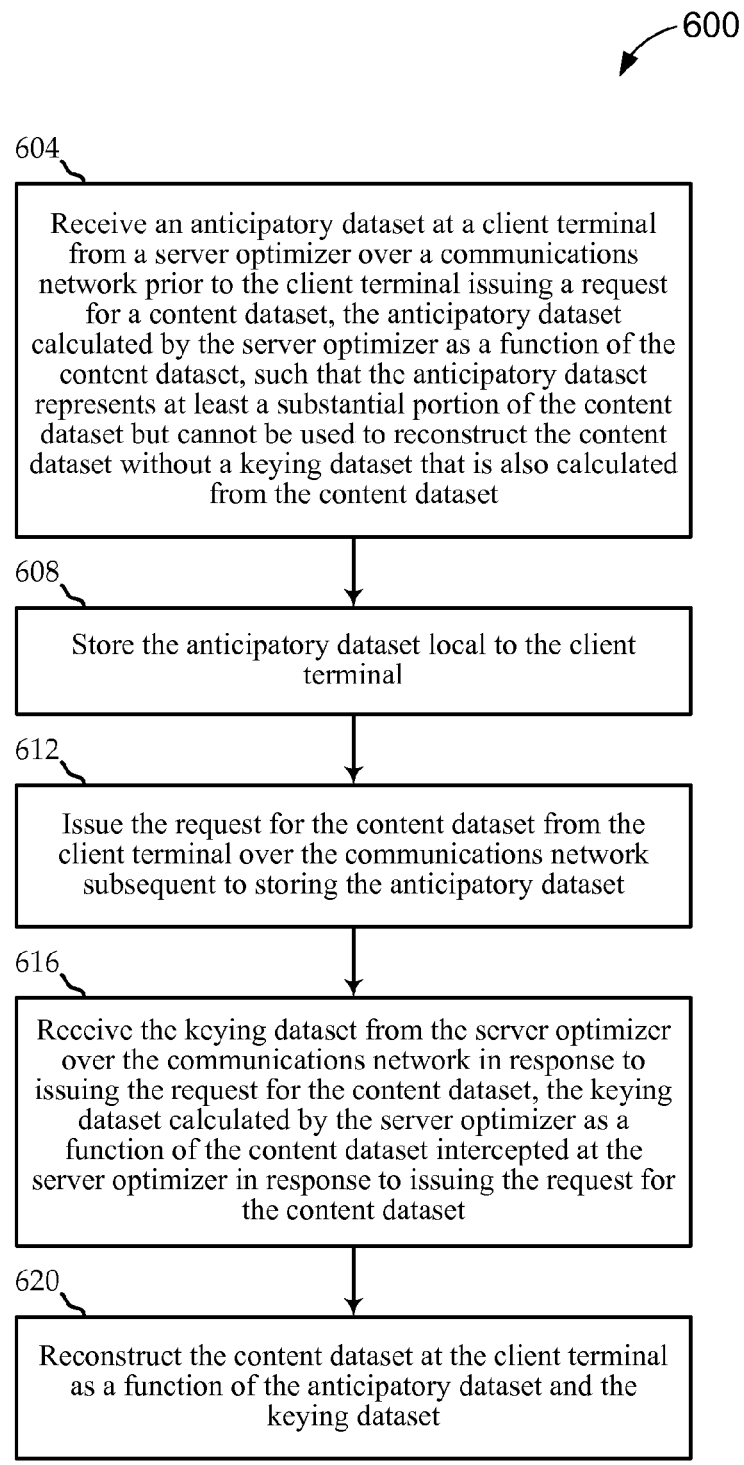
FIG. 6, a flow diagram is shown of an illustrative method for client-side handling of data communicated to the client according to embodiments of self-keying techniques.

Turning to FIG. 6, a flow diagram is shown of an illustrative method 600 for client-side handling of data communicated to the client according to embodiments of self-keying techniques. The method 600 begins at stage 604 by receiving an anticipatory dataset at a client terminal from a server optimizer over a communications network prior to the client terminal issuing a request for a content dataset. As discussed above, the anticipatory dataset is calculated by the server optimizer as a function of the content dataset, such that the anticipatory dataset represents at least a substantial portion of the content dataset but cannot be used to reconstruct the content dataset without a keying dataset that is also calculated from the content dataset. At stage 608, the anticipatory dataset is stored local to the client terminal.

At some subsequent time, as illustrated by stage 612, a request for the content dataset is issued from the client terminal over the communications network. Notably, as of stage 612, the client terminal has a locally stored copy of the anticipatory dataset. However, even if the client terminal could access the locally stored data, the data could not be used by itself to reconstruct the requested content set.

At stage 616, a keying dataset is received from the server optimizer over the communications network in response to issuing the request for the content dataset. As discussed above, the keying dataset is calculated by the server optimizer as a function of the content dataset intercepted at the server optimizer in response to issuing the request for the content dataset. Having both the anticipatory dataset and the keying dataset, the client can reconstruct the content dataset as a function of the anticipatory dataset and the keying dataset at stage 620.

Figure 7:
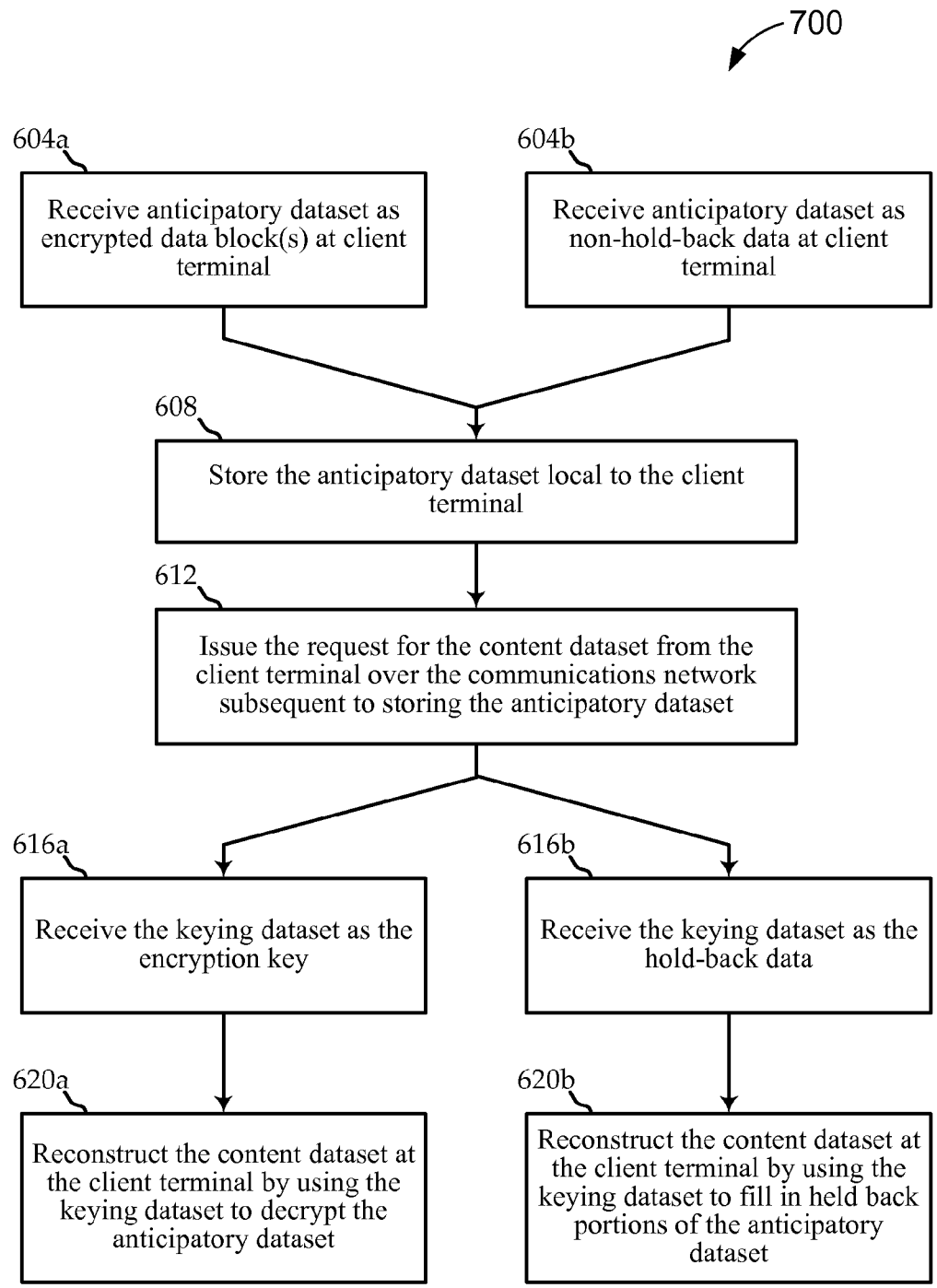
FIG. 7 shows a flow diagram of illustrative methods for client-side handling of data communicated to the client as various implementations of the method of FIG. 6.

It will be appreciated that the method 600 can be implemented in different ways to account for various types of self-keying techniques. FIG. 7 shows a flow diagram of illustrative methods 700 for client-side handling of data communicated to the client as various implementations of the method 600 of FIG. 6. The method 700 begins at one of two embodiments of stage 604 by receiving an anticipatory dataset at a client terminal from a server optimizer over a communications network prior to the client terminal issuing a request for a content dataset. According to stage 604a, the anticipatory dataset is received as one or more encrypted data blocks (e.g., according to the method 500a of FIG. 5A). According to stage 604b, the anticipatory dataset is received as a remaining dataset (e.g., according to the method 500b of FIG. 5B).

As in FIG. 6, the anticipatory dataset is stored local to the client terminal at stage 608, and, subsequently, a request for the content dataset is issued from the client terminal over the communications network at stage 612. The remainder of the method 700, represented as embodiments of stages 616 and 620, describes reconstruction of the content dataset from the anticipatory dataset according to the type of anticipatory dataset received in stages 604a or 604b.

According to some configurations, as described with reference to stage 604a, the anticipatory dataset is received as one or more encrypted data blocks. At stage 616a, encryption data is received as a keying dataset from the server optimizer over the communications network in response to issuing the request for the content dataset. For example, an encryption key (e.g., an encryption digest) is calculated by the server optimizer as a function of the copy of the content dataset intercepted at the server optimizer in response to issuing the request for the content dataset. Having both the encrypted data blocks as the anticipatory dataset and the encryption keys as the keying dataset, the client can reliably reconstruct the content dataset at stage 620a. The reconstructed data can then be used to fulfill the request issued in stage 612.

According to other configurations, as described with reference to stage 604b, the anticipatory dataset is received as a remaining dataset (i.e., corresponding to a hold-back dataset). At stage 616b, a corresponding hold-back dataset is received as a keying dataset from the server optimizer over the communications network in response to issuing the request for the content dataset. For example, hold-back data is calculated by the server optimizer as a function of the copy of the content dataset intercepted at the server optimizer in response to issuing the request for the content dataset. Having both the remaining dataset as the anticipatory dataset and the hold-back dataset as the keying dataset, the client can reliably reconstruct the content dataset at stage 620b. The reconstructed data can then be used to fulfill the request issued in stage 612.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels, and/or various other storage mediums capable of storing that contain or carry instruction(s) and/or data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the principles of the disclosure have been described above in connection with specific apparatuses and methods, it is to be clearly understood that this description is made only by way of example and not as a limitation on the scope of the disclosure.

What is claimed is:

1. A method comprising:
receiving a first copy of a content dataset at a proxy server of a communications network without a corresponding request for the content dataset from a first client terminal over the communications network;
calculating an anticipatory dataset as a function of the content dataset, such that the anticipatory dataset represents at least a portion of the content dataset but cannot be used to reconstruct the content dataset without a keying dataset that is also calculated from the content dataset;
communicating the anticipatory dataset to the first client terminal from the proxy server over the communications network for anticipatory storage of the anticipatory dataset local to the first client terminal; and
subsequent to communicating the anticipatory dataset to the first client terminal:
intercepting a second copy of the content dataset at the proxy server, the second copy of the content dataset being communicated to the first client terminal in response to a content request issued by the first client terminal for the content dataset;
calculating the keying dataset as a function of the second copy of the content dataset at the proxy server; and
communicating the keying dataset from the proxy server to the client terminal for use by the first client terminal in locally reconstructing the content dataset as a function of the keying dataset and the anticipatory dataset;
wherein calculating the keying dataset comprises extracting a hold-back portion of the content dataset to use as the keying dataset; and
wherein calculating the anticipatory dataset as a function of the content dataset comprises removing the hold-back portion of the content dataset to generate the anticipatory dataset, so that the anticipatory dataset cannot be used to reconstruct the content dataset without the keying dataset.

2. The method of claim 1, wherein calculating the anticipatory dataset as a function of the content dataset comprises: encrypting the content dataset to generate the anticipatory dataset in such a way that the anticipatory dataset cannot be used to reconstruct the content dataset without decrypting the anticipatory dataset as a function of the keying dataset.

3. The method of claim 1, wherein:
calculating the anticipatory dataset as a function of the content dataset comprises encrypting the content dataset to generate the anticipatory dataset in such a way that the content dataset is reconstructable by decrypting the anticipatory dataset as a function of the keying dataset.

4. The method of claim 1, wherein receiving the first copy of the content dataset at the proxy server of the communications network without the corresponding request for the content dataset from the client terminal over the communications network comprises intercepting the first copy of the content dataset at the proxy server, the first copy of the content dataset being communicated to a second client terminal in response to a content request issued by the second client terminal for the content dataset.

5. The method of claim 4, further comprising:
calculating the keying dataset as a function of the first copy of the content dataset at the proxy server; and
communicating the anticipatory dataset and the keying dataset to the second client terminal from the proxy server over the communications network for local reconstruction at the second client terminal of the content dataset as a function of the keying dataset and the anticipatory dataset in response to the content request issued by the second client terminal for the content dataset.

6. The method of claim 5, wherein communicating the anticipatory dataset and the keying dataset to the second client terminal from the proxy server over the communications network comprises:
multicasting the anticipatory dataset to at least the first client terminal and the second client terminal; and
unicasting the keying dataset only to the first client terminal.

7. The method of claim 5, further comprising:
removing the first copy of the content dataset and the keying dataset from the proxy server subsequent to communicating the anticipatory dataset and the keying dataset to the second client terminal and prior to receiving a content request issued by the first client terminal for the content dataset.

8. The method of claim 4, further comprising:
communicating the first copy of the content dataset to the second client terminal from the proxy server over the communications network in response to the content request issued by the second client terminal for the content dataset.

9. The method of claim 1, further comprising:
removing the first copy of the content dataset from the proxy server subsequent to communicating the anticipatory dataset to the first client terminal.

10. The method of claim 1, further comprising:
determining that the second copy of the content dataset is equivalent to the first copy of the content dataset,
wherein the calculating the keying dataset step and the communicating the keying dataset step are performed only when the second copy of the content dataset is equivalent to the first copy of the content dataset.

11. A server system disposed at a server side of a communications network and in operative communications with a plurality of client terminals disposed at respective client sides of the communications network, the server system comprising:
a proxy server comprising a memory configured to:
receive a first copy of a content dataset without a corresponding request for the content dataset from a first client terminal over the communications network;
calculate an anticipatory dataset as a function of the content dataset, such that the anticipatory dataset represents at least a portion of the content dataset but cannot be used to reconstruct the content dataset without a keying dataset that is also calculated from the content dataset;
communicate the anticipatory dataset to the first client terminal from the proxy server over the communications network for anticipatory storage of the anticipatory dataset local to the first client terminal; and
subsequent to communicating the anticipatory dataset to the first client terminal:
intercept a second copy of the content dataset at the proxy server, the second copy of the content dataset being communicated to the first client terminal in response to a content request issued by the first client terminal for the content dataset;
calculate the keying dataset as a function of the second copy of the content dataset at the proxy server; and
communicate the keying dataset from the proxy server to the client terminal for use by the first client terminal in locally reconstructing the content dataset as a function of the keying dataset and the anticipatory dataset;
wherein calculating the keying dataset by the proxy server comprises extracting a hold-back portion of the content dataset to use as the keying dataset; and
wherein calculating the anticipatory dataset by the proxy server as a function of the content dataset comprises removing the hold-back portion of the content dataset to generate the anticipatory dataset, so that the anticipatory dataset cannot be used to reconstruct the content dataset without the keying dataset.

12. The server system of claim 11, wherein the proxy server is configured to calculate the anticipatory dataset as a function of the content dataset by:
encrypting the content dataset to generate the anticipatory dataset in such a way that the anticipatory dataset cannot be used to reconstruct the content dataset without decrypting the anticipatory dataset as a function of the keying dataset.

13. The server system of claim 11, wherein:
calculating the anticipatory dataset as a function of the content dataset comprises encrypting the content dataset to generate the anticipatory dataset in such a way that the content dataset is reconstructable by decrypting the anticipatory dataset as a function of the keying dataset.

14. A method comprising:
receiving an anticipatory dataset at a client terminal from a proxy server over a communications network prior to the client terminal issuing a request for a content dataset, the anticipatory dataset calculated by the proxy server as a function of the content dataset, such that the anticipatory dataset represents at least a portion of the content dataset but cannot be used to reconstruct the content dataset without a keying dataset that is also calculated from the content dataset;
storing the anticipatory dataset local to the client terminal;

issuing the request for the content dataset from the client terminal over the communications network subsequent to storing the anticipatory dataset;

receiving the keying dataset from the proxy server over the communications network in response to issuing the request for the content dataset, the keying dataset calculated by the proxy server as a function of the content dataset intercepted at the proxy server in response to issuing the request for the content dataset; and reconstructing the content dataset at the client terminal as a function of the anticipatory dataset and the keying dataset wherein the keying dataset is calculated by the proxy server as a function of the content dataset by extracting a hold-back portion of the content dataset to use as the keying dataset; and wherein the anticipatory dataset is calculated by the proxy server as a function of the content dataset by removing the hold-back portion of the content dataset to generate the anticipatory dataset, so that the anticipatory dataset cannot be used to reconstruct the content dataset without the keying dataset.

15. The method of claim 14, wherein:

the anticipatory dataset is calculated by the proxy server as a function of the content dataset by encrypting the content dataset to generate the anticipatory dataset in such a way that the anticipatory dataset cannot be used to reconstruct the content dataset without decrypting the anticipatory dataset as a function of the keying dataset; and reconstructing the content dataset at the client terminal as a function of the anticipatory dataset and the keying dataset comprises decrypting the anticipatory dataset as a function of the keying dataset at the client terminal.

16. The method of claim 14 further comprising:

reconstructing the content dataset at the client terminal as a function of the anticipatory dataset and the keying dataset comprises filling in missing portions of the anticipatory dataset with the keying dataset at the client terminal.

17. A client system disposed at a client side of a communications network and in operative communications with a proxy server disposed at a server side of the communications network, the client system comprising:

a proxy client comprising a memory configured to:

receive an anticipatory dataset from the proxy server over the communications network prior to issuing a request for a content dataset, the anticipatory dataset calculated by the proxy server as a function of the content dataset, such that the anticipatory dataset represents at least a portion of the content dataset but cannot be used to reconstruct the content dataset without a keying dataset that is also calculated from the content dataset;

store the anticipatory dataset local to the proxy client;

issue the request for the content dataset over the communications network subsequent to storing the anticipatory dataset;

receive the keying dataset from the proxy server over the communications network in response to issuing the request for the content dataset, the keying dataset calculated by the proxy server as a function of the content dataset intercepted at the proxy server in response to issuing the request for the content dataset; and reconstruct the content dataset as a function of the anticipatory dataset and the keying dataset;

wherein the keying dataset is calculated by the proxy server as a function of the content dataset by extracting a hold-back portion of the content dataset to use as the keying dataset; and wherein the anticipatory dataset is calculated by the proxy server as a function of the content dataset by removing the hold-back portion of the content dataset to generate the anticipatory dataset, so that the anticipatory dataset cannot be used to reconstruct the content dataset without the keying dataset.

18. The client system of claim 17, wherein:

the anticipatory dataset is calculated by the proxy server as a function of the content dataset by encrypting the content dataset to generate the anticipatory dataset in such a way that the anticipatory dataset cannot be used to reconstruct the content dataset without decrypting the anticipatory dataset as a function of the keying dataset; and reconstructing the content dataset as a function of the anticipatory dataset and the keying dataset comprises decrypting the anticipatory dataset as a function of the keying dataset.

19. The client system of claim 17 further comprising:

reconstructing the content dataset as a function of the anticipatory dataset and the keying dataset comprises filling in missing portions of the anticipatory dataset with the keying dataset.

* * * * *